Feb. 9, 1932.  F. ERIKSON ET AL  1,844,217
TRACTOR PLOW HITCH
Filed May 22, 1930
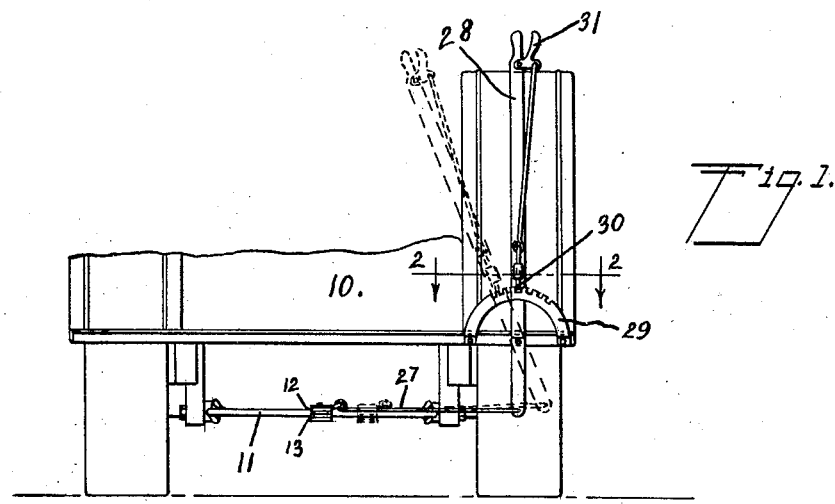
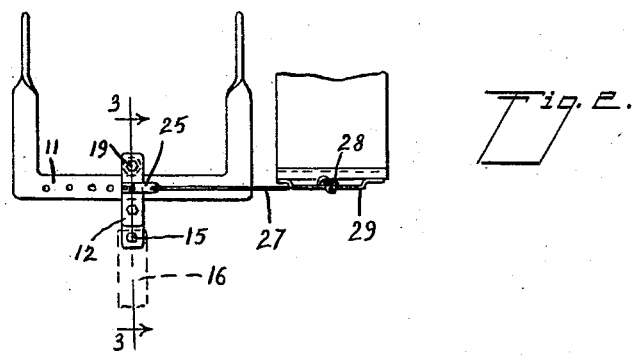
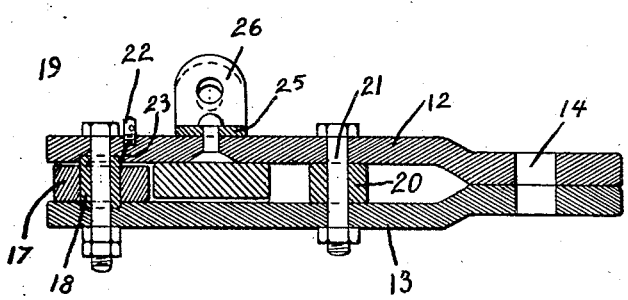
FRANK ERIKSON.  Inventor
EMIL W. WEBER.
By David O. Barnell
Attorney Patented Feb. 9, 1932

1,844,217

UNITED STATES PATENT OFFICE

FRANK ERIKSON AND EMIL W. WEBER, OF HERMAN, NEBRASKA

TRACTOR PLOW HITCH

Application filed May 22, 1930. Serial No. 454,640.

Our invention relates to tractor plow-hitches and particularly to so-called "side-hill adjusters" therefor. In plowing with a tractor, the plow, on laterally sloping ground, has a tendency to swerve down-hill so that it will turn over a furrow slice of less or greater width than the normal slice, depending upon whether the ground slopes away from or toward the land side of the furrow, so that although the tractor be maintained in a straight course relative to the furrow-line the plow may deviate from its normal course. It is therefore the object of our invention to provide, for connecting a plow to a tractor draw-bar, a plow-hitch of simple, durable and inexpensive construction, whereby to easily and quickly adjust the plow, to maintain a normal course on lateral sloping ground and produce a furrow slice or uniform width. It is a further object to provide a device of this character that will not clog with earth or the like, and which may be moved so easily and quickly as to enable adjustments thereof during the forward movement of the tractor and plow, whereby to conform with the varying surface contours encountered in plowing long furrows across a field of undulating or rolling surface, without stopping movement of the tractor while making the desired adjustments.

In the accompanying drawings:

Fig. 1 is an end elevation of part of a tractor embodying my invention.

Fig. 2 is a section taken on line 2—2 of Fig. 1.

Fig. 3 is a section of the hitch taken on line 3—3 of Fig. 2.

Referring more particularly to the drawings there is shown a portion 10 of a tractor having a rearwardly extending transverse draw-bar 11 fixedly secured to the frame thereof. The hitch comprises a frame including a pair of parallel, spaced metal straps 12 and 13 disposed respectively above and below the draw-bar. The straps are inclined or offset intermediate their ends to bring the rear end portions into parallel abutment to form a hitching bar and said bar is provided with an opening 14 for receiving a bolt 15 secured in the clevis of a plow-beam 16. A roller 17 for reducing friction between the hitch and draw-bar during the adjusting movement of said hitch is rotatably mounted on a sleeve 18 secured between the straps 12 and 13 adjacent to their forward ends. The sleeve 18 is secured between the straps 12 and 13 by a bolt 19 received in openings in said straps and the ends of the sleeves are received in counter-bored openings in the adjoining sides of the straps concentric with the bolt 19. The ends of the sleeve thus receive, through the roller, the pull of the plow on the draw-bar and relieve the bolt 19 of any strain, thus preventing its being sheared off by any unusual pull of the plow. The sleeve serves as a bearing for the roller and maintains the forward ends of the straps in their spaced relation to each other. The rear ends of the straps are maintained in their spaced relation by a sleeve 20 mounted therebetween and secured by a bolt 21 in openings provided therefor. Adjacent to the bolt 19, in the strap 12, is located a pressure feed lubricating connection 22 from which an opening 23 extends to the side of the sleeve 18 whereby grease is supplied to the bearing surface and the pressure of the lubricant is caused to expell foreign matter from the bearing surfaces.

The draw-bar 11 fits losely between the straps 12 and 13 which are spaced apart a greater distance than the thickness of said draw-bar; and the space between the sleeve 20 and the roller 17 is substantially greater than the width of the draw-bar so that when the roller 17 is engaged with the front edge of the draw-bar the hitch-frame may swing laterally about the axis of said roller 17, to extend diagonally of the draw-bar, without causing the sleeve 20 to engage the rear edge of the draw-bar. On the top of strap 12, substantially above the draw-bar, is fixedly secured a bar 25 which projects laterally of the strap and has an inclined perforated end portion 26 in which is received the looped end of a connecting link 27 which extends to and is connected with the lower end of the adjusting-lever 28. The lever 28 is fulcrumed on the tractor frame and is movable in a transverse vertical plane. A notched segment 29 is fixedly attached to the tractor frame and is engageable by a locking pin 30 controlled by a grip piece 31 on the handle of the lever in the usual way.

In Figs. 1 and 2 the hitch is shown in the normal central position, for use when the plow has no tendency to swerve to either side from the desired line of travel, and in dotted lines in Fig. 1 there is indicated an adjustment of the hitch for use of the plow on a side-hill or lateral slope of the ground. During the forward movement of the tractor the pull from the plow to the draw-bar is received entirely through the roller 17, by which friction is substantially eliminated, and the hitch device may thus be readily shifted along the draw-bar in either direction, as may be necessary to rectify the draft upon the plow to cause the same to follow the desired path. The adjusting-lever is so located, relative to the seat for the driver of the tractor, that he may grasp the handle thereof, release the locking-pin from the segment, move the handle to effect the desired lateral shifting of the hitch, and allow the locking-pin to re-engage the segment at a suitable notch for maintaining the desired adjustment, without stopping the forward movement of the tractor and while the plow is under traction; and any desired adjustment, even from one limit of adjustment to the opposite extreme, may be accomplished within the time required for the tractor to move forward only a short distance.

Having thus described our invention what we claim is:

The combination with a tractor having a transversely extending draw-bar, of a plow-hitch comprising a pair of straps having their rear portions fixedly connected and their front portions vertically spaced to extend above and below the draw-bar, a vertical sleeve disposed in front of the draw-bar and having its ends affixed in said straps, a roller mounted revolubly on said sleeve and adapted to engage the front edge of the draw-bar, means at the rear ends of said straps for pivotally connecting a plow therewith, actuating means movable substantially parallel with the draw-bar, means connecting said actuating means with said straps at a point intermediate said plow-connecting means and said roller and closer to the latter than to the former, and means for locking said actuating means in adjusted positions.

FRANK ERIKSON.
EMIL W. WEBER.